(12) United States Patent
Mayr et al.

(10) Patent No.: US 9,988,022 B2
(45) Date of Patent: Jun. 5, 2018

(54) SENSOR DEVICE, HYDRAULIC UNIT FOR COOPERATING WITH THE SENSOR DEVICE, BRAKING SYSTEM, AND METHOD FOR INSTALLING THE SENSOR DEVICE

(71) Applicant: Robert Bosch GmbH, Stuttgart (DE)

(72) Inventors: Matthias Mayr, Rettenberg (DE); Bernd Lutz, Kempten (DE); Juergen Tandler, Fuessen (DE); Andreas Weh, Sulzberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 365 days.

(21) Appl. No.: 14/944,955

(22) Filed: Nov. 18, 2015

(65) Prior Publication Data
US 2016/0144836 A1 May 26, 2016

(30) Foreign Application Priority Data
Nov. 20, 2014 (DE) .................... 10 2014 223 731

(51) Int. Cl.
| | |
|---|---|
| *B60T 17/22* | (2006.01) |
| *B60T 7/04* | (2006.01) |
| *B60T 11/16* | (2006.01) |
| *B60T 13/66* | (2006.01) |
| *B60T 8/171* | (2006.01) |
| *B60T 8/36* | (2006.01) |

(52) U.S. Cl.
CPC .............. *B60T 7/042* (2013.01); *B60T 8/171* (2013.01); *B60T 11/165* (2013.01); *B60T 13/662* (2013.01); *B60T 17/221* (2013.01); *B60T 8/368* (2013.01); *B60T 2220/04* (2013.01)

(58) Field of Classification Search
CPC .......... B60T 7/042; B60T 8/368; B60T 17/22; B60T 17/221; B60T 2220/04; F15B 15/2861
See application file for complete search history.

(56) References Cited

U.S. PATENT DOCUMENTS

| | | | |
|---|---|---|---|
| 4,914,916 A * | 4/1990 | Leigh-Monstevens | ..................... B60T 17/226 60/534 |
| 6,564,694 B2 * | 5/2003 | Zumberge | ............. B60T 8/4081 60/534 |
| 6,612,659 B2 * | 9/2003 | Fulks | ..................... B60T 7/042 60/534 |
| 6,732,517 B2 * | 5/2004 | Zehnder, II | ............... B60T 8/38 60/534 |
| 7,018,002 B2 * | 3/2006 | Masson | ............... F15B 15/2807 60/534 |

FOREIGN PATENT DOCUMENTS

DE     199 37 818     2/2001

* cited by examiner

*Primary Examiner* — Michael Leslie
(74) *Attorney, Agent, or Firm* — Norton Rose Fulbright US LLP; Gerard Messina (57) ABSTRACT

A sensor device for detecting a displacement of a master brake cylinder piston of a master brake cylinder situated on and/or in a hydraulic unit includes: a sensor element; an evaluation electronics system; a first molded part on or in which the at least one sensor element is situated, the first molded part including at least one first electrical contact element; and a second molded part. The at least one first electrical contact element contacts at least one second electrical contact element of the second molded part which is at least partially introduced into the second opening.

13 Claims, 7 Drawing Sheets

SENSOR DEVICE, HYDRAULIC UNIT FOR COOPERATING WITH THE SENSOR DEVICE, BRAKING SYSTEM, AND METHOD FOR INSTALLING THE SENSOR DEVICE

BACKGROUND OF THE INVENTION

1. Field of the Invention

The present invention relates to a sensor device for detecting a displacement of a master brake cylinder piston of a master brake cylinder situated on and/or in a hydraulic unit. Moreover, the present invention relates to a hydraulic unit for cooperating with the sensor device. Moreover, the present invention relates to a braking system for a motor vehicle. Furthermore, the present invention relates to a method for installing the sensor device.

2. Description of the Related Art

Pedal travel sensors are typically used in electrohydraulic braking systems.

Published German patent application document DE 199 37 818 A1 provides a method and a device for controlling a vehicle braking system. In this regard, a brake pedal is provided with a pedal travel sensor. The signal of the pedal travel sensor is supplied to a control unit. Via the pedal travel sensor it is ascertained how far the driver depresses the brake pedal. A corresponding pedal force is ascertained via a correlation, which is prestored and/or appropriately computed using the actual states, between the pedal travel and a pedal force.

BRIEF SUMMARY OF THE INVENTION

The present invention provides a sensor device for detecting a displacement of a master brake cylinder piston of a master brake cylinder situated on and/or in a hydraulic unit, including at least one sensor element and an evaluation electronics system, the at least one sensor element being designed in such a way that the displacement of the master brake cylinder piston in each case changes at least one physical variable in the at least one sensor element, and the evaluation electronics system being designed for determining a piece of information concerning the displacement of the master brake cylinder piston, taking into account the at least one read-out and/or provided physical variable, characterized by a first molded part on or in which the at least one sensor element is situated, the first molded part including at least one first electrical contact element, and the first molded part being at least partially introducible into a first opening in the hydraulic unit, and a second molded part on or in which the evaluation electronics system is situated, the second molded part including at least one second electrical contact element, and the second molded part being at least partially introducible into a second opening in the hydraulic unit, and the at least one first electrical contact element of the first molded part which is at least partially introduced into the first opening contacting the at least one second electrical contact element of the second molded part which is at least partially introduced into the second opening, in such a way that the at least one physical variable is transmittable from the at least one sensor element to the evaluation electronics system.

Moreover, the present invention provides a hydraulic unit for cooperating with a sensor device for detecting a displacement of a master brake cylinder piston of a master brake cylinder situated on and/or in the hydraulic unit, including a first opening which is designed for at least partially accommodating a first molded part of the sensor device, on or in which at least one sensor element is situated and which includes at least one first electrical contact element, and including a second opening which is designed for at least partially accommodating a second molded part of the sensor device, on or in which the evaluation electronics system is situated and which includes at least one second electrical contact element, the first and second openings being designed in such a way that the at least one first electrical contact element of the first molded part which is at least partially introduced into the first opening contacts the at least one second electrical contact element of the second molded part which is at least partially introduced into the second opening, in such a way that the at least one physical variable is transmittable from the at least one sensor element to the evaluation electronics system.

Moreover, the present invention provides a braking system for a motor vehicle, including a sensor device for detecting a displacement of a master brake cylinder piston of a master brake cylinder situated on and/or in a hydraulic unit, and a hydraulic unit for cooperating with the sensor device.

Furthermore, the present invention provides a method for installing a sensor device for detecting a displacement of a master brake cylinder piston of a master brake cylinder situated on and/or in a hydraulic unit. The method includes at least partially introducing a first molded part of the sensor device, on or in which at least one sensor element is situated, the first molded part including at least one first electrical contact element, into a first opening in the hydraulic unit. The method also includes at least partially introducing a second molded part of the sensor device, on or in which an evaluation electronics system is situated, the second molded part including at least one second electrical contact element, into a second opening in the hydraulic unit. The method also includes connecting the first molded part to the second molded part for transmitting a physical variable from the at least one sensor element to the evaluation electronics system by connecting the first electrical contact element of the first molded part to the second electrical contact element of the second molded part.

It is a concept of the present invention to provide a sensor device which is configured for detecting the displacement of the master brake cylinder piston of the master brake cylinder, and sending the signal to the evaluation electronics system via a direct or shortest possible connection. Due to situating the sensor device through the first and second openings formed in the hydraulic unit, the requirement for providing plug-in connections outside the hydraulic unit is dispensed with.

According to one preferred refinement, it is provided that the at least one sensor element is situated on a circuit board, the first molded part including a lead frame which connects the circuit board to the at least one first electrical contact element of the first molded part, and the second molded part including a lead frame which connects the at least one second electrical contact element of the second molded part to the evaluation electronics system. Due to the two-part design of the sensor device, the shape of the sensor device may advantageously be adapted to structural requirements of the device for detecting the displacement of the piston of the master brake cylinder. Simple, secure electrical contacting may be made possible by providing the lead frame. In addition, the lead frame has possibilities for numerous geometric configurations, which allows a variety of possible structures of the sensor device.

According to another preferred refinement, it is provided that the first molded part of the sensor device includes a rotationally symmetrical part and a nonrotationally symmetrical part, the rotationally symmetrical part being introducible into the first opening in the hydraulic unit and the nonrotationally symmetrical part being introducible into an opening in a brake booster, the nonrotationally symmetrical part including a molding which is designed for being connected in a form-fit manner to a groove or shoulder of the opening in the brake booster. A stable, reliable connection or fit between the sensor device and the opening formed in the brake booster may be provided in this way. In addition, the sensor device is held rotationally fixed in a desired spatial orientation. Furthermore, a stable angular position of the sensor device may be ensured as the result of using the two differently shaped parts.

According to another preferred refinement, it is provided that the second molded part of the sensor device is designed in such a way that a position, an angular orientation, and a depth stop of the second molded part in the second opening in the hydraulic unit are definable. The second molded part of the sensor device may thus advantageously be adapted to the particular basic structural conditions of the evaluation electronics system and/or the hydraulic unit.

According to another preferred refinement, it is provided that the at least one sensor element is designed for detecting a displacement of the master brake cylinder piston of the master brake cylinder situated on and/or in the hydraulic unit by detecting a movement of a support element, situated on the master brake cylinder piston of the master brake cylinder and equipped with at least one magnet, relative to the at least one sensor element. The support element may thus be advantageously situated in such a way that simple, reliable detection of a displacement of the master brake cylinder piston of the master brake cylinder by the at least one sensor element is made possible.

According to another preferred refinement, it is provided that the first opening and the second opening in the hydraulic unit are each formed by a borehole, the first molded part and/or the second molded part being fixable in the borehole in a predetermined orientation. The sensor device may thus be held in the borehole in a rotationally fixed manner due to the stable angular position.

According to another preferred refinement, it is provided that an opening in a brake booster has, at least in sections, a groove or shoulder which is designed for cooperating with a molding of the first molded part in the installed state of the first molded part in such a way that the first molded part, in particular a nonrotationally symmetrical part of the first molded part, is situated in the opening in a form-fit manner. A stable, reliable connection or fit between the sensor device and the opening formed in the brake booster may thus be provided. In addition, the sensor device is held in a desired spatial orientation in a rotationally fixed manner.

According to another preferred refinement, it is provided that a support element for at least one magnet is situated on and axially fixed to the master brake cylinder piston of the master brake cylinder, the support element being accommodated in an opening in the brake booster axially parallel to the first opening. The support element may thus be advantageously situated in such a way that simple, reliable detection of a displacement of the master brake cylinder piston of the master brake cylinder by the at least one sensor element is made possible.

According to another preferred refinement, it is provided that the second opening in the hydraulic unit is designed in such a way that a position, an angular orientation, and a depth stop of the second molded part in the second opening in the hydraulic unit are definable. The second molded part of the sensor device may thus advantageously be adapted to the particular basic structural conditions of the evaluation electronics system and/or the hydraulic unit.

According to another preferred refinement, it is provided that the first molded part of the sensor device includes a rotationally symmetrical part and a nonrotationally symmetrical part, the rotationally symmetrical part being introduced into the first opening in the hydraulic unit and the nonrotationally symmetrical part being introduced into an opening in the brake booster, the nonrotationally symmetrical part including a molding which is connected to a groove or shoulder of the opening in the brake booster in a form-fit manner. A stable, reliable connection or fit between the sensor device and the opening formed in the brake booster may thus be provided. In addition, the sensor device is held rotationally fixed in a desired spatial orientation. Furthermore, a stable angular position of the sensor device in the opening may be ensured as the result of using the two differently shaped parts.

The described embodiments and refinements may be arbitrarily combined with one another.

Further possible embodiments, refinements, and implementations of the present invention also include combinations, not explicitly mentioned, of features of the present invention described above and below with regard to the exemplary embodiments.

The appended drawings are intended to provide a better understanding of the specific embodiments of the present invention. They illustrate specific embodiments, and are used in conjunction with the description to explain principles and concepts of the present invention.

Other specific embodiments and many of the mentioned advantages are apparent from the drawings. The illustrated elements in the drawings are not necessarily shown true to scale relative to one another.

DETAILED DESCRIPTION OF THE INVENTION

Unless stated otherwise, identical or functionally equivalent elements, parts, or components are denoted by the same reference numerals in the figures of the drawings.

Figure 1:
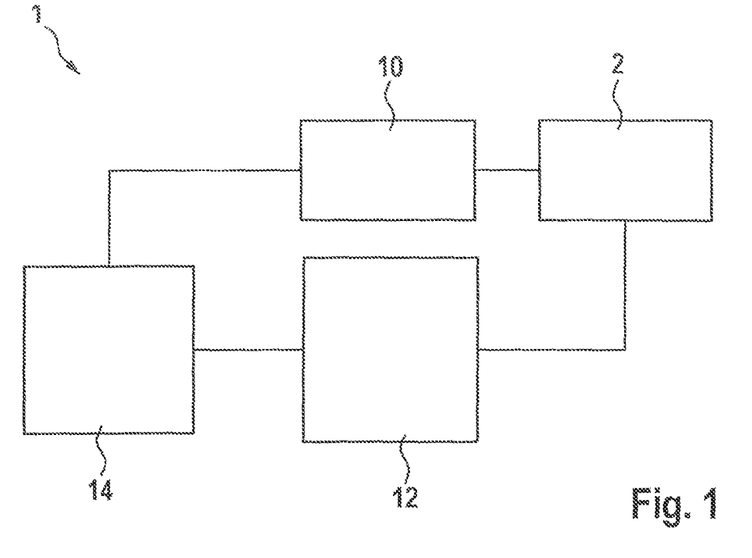
FIG. 1 shows a block diagram of a braking system for a motor vehicle according to one preferred specific embodiment of the present invention.

FIG. 1 shows a block diagram of a braking system for a motor vehicle according to one preferred specific embodiment of the present invention.

Braking system 1 includes a sensor device 10 for detecting a displacement of a master brake cylinder piston 2 of a master brake cylinder 3 situated on and/or in a hydraulic unit 12, hydraulic unit 12, and an evaluation electronics system 14 which is designed for determining a piece of information concerning the displacement of master brake cylinder piston 2, taking into account a read-out and/or provided physical variable.

Sensor device 10 is configured for detecting the displacement of master brake cylinder piston 2 of master brake cylinder 3. Hydraulic unit 12 is connectable to respective wheel brakes of the motor vehicle. Sensor device 10 is connected to evaluation electronics system 14 via an opening (not shown in FIG. 1) in hydraulic unit 12. Evaluation electronics system 14 is also connected to hydraulic unit 12 for controlling same.

Figure 2:
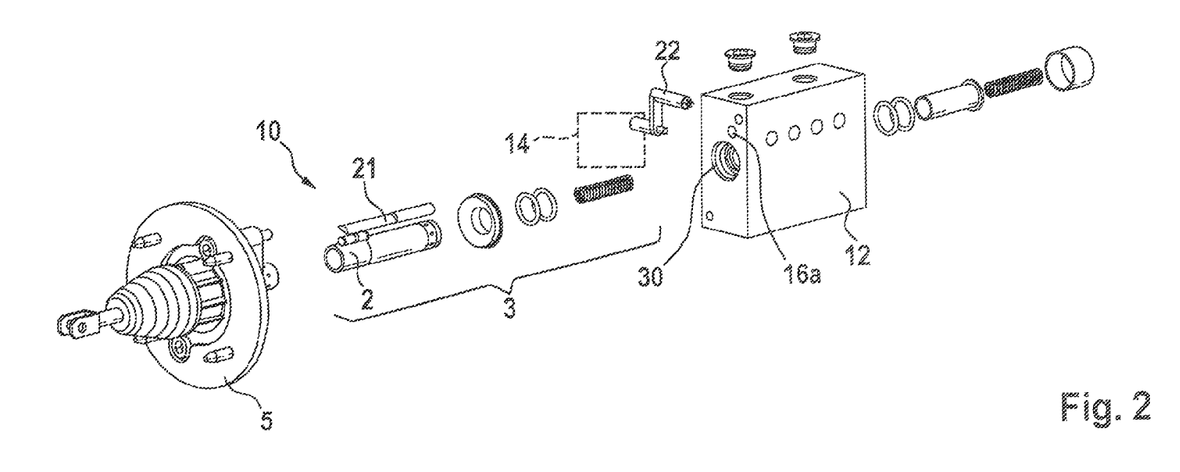
FIG. 2 shows an exploded illustration of a sensor device for detecting a displacement of a master brake cylinder piston of a master brake cylinder situated on and/or in a hydraulic unit according to the preferred specific embodiment of the present invention.

FIG. 2 shows an exploded illustration of a sensor device for detecting a displacement of a master brake cylinder piston of a master brake cylinder situated on and/or in a hydraulic unit according to the preferred specific embodiment of the present invention.

FIG. 2 shows a brake booster 5 which is designed for displacing the master brake cylinder piston of the master brake cylinder with the aid of an electric motor which is connected to a spindle, in response to a user actuating a brake pedal. In the installed state of the braking system, the master brake cylinder piston is situated partly in a third opening 30 in the hydraulic unit and partly in an opening formed in brake booster 5 for accommodating the master brake cylinder piston.

As an alternative to providing a power brake, some other suitable braking system or some other suitable brake booster may be provided. Sensor device 10 is situated directly above master brake cylinder piston 2, equipped with a magnet, of master brake cylinder 3. Sensor device 10 includes a first molded part 21 and a second molded part 22 which is connectable to first molded part 21. First molded part 21 extends essentially in parallel to master brake cylinder piston 2 of master brake cylinder 3. In the installed state of sensor device 10, a support element for the magnet, situated on master brake cylinder piston 2 of master brake cylinder 3, and the magnet are accommodated in an opening (not shown in FIG. 2) in brake booster 5.

At a first end section, second molded part 22 of sensor device 10 is connected to evaluation electronics system 14. Second molded part 22 preferably has a Z-shaped design. Alternatively, second molded part 22 may also have some other suitable shape. In the present exemplary embodiment, evaluation electronics system 14 is situated on a side wall of hydraulic unit 12, so that second molded part 22 of the sensor is situated perpendicular to first molded part 21 of sensor device 10, and contacts same essentially at a right angle. In the installed state, sensor device 10 is situated partly in hydraulic unit 12, and is connected to evaluation electronics system 14 through a second opening 16b formed in hydraulic unit 12.

The sensor element is designed in such a way that the displacement of the master brake cylinder piston in the sensor element in each case changes a physical variable. Evaluation electronics system 14 is designed for determining a piece of information concerning the displacement of the master brake cylinder piston, taking into account the read-out and/or provided physical variable.

First molded part 21 includes a first electrical contact element 21e. First molded part 21 is partially introducible into a first opening 16a in hydraulic unit 12, and is partially introducible into an opening (not shown in FIG. 2) in brake booster 5. Second molded part 22 includes a second electrical contact element 23b. Second molded part 22 is partially introducible into a second opening 16b in hydraulic unit 12.

First electrical contact element 21e of first molded part 21, partially introduced into first opening 16a, contacts second electrical contact element 23b of second molded part 22, partially introduced into second opening 16b, in such away that the physical variable is transmittable from the sensor element to the evaluation electronics system.

Figure 3A:
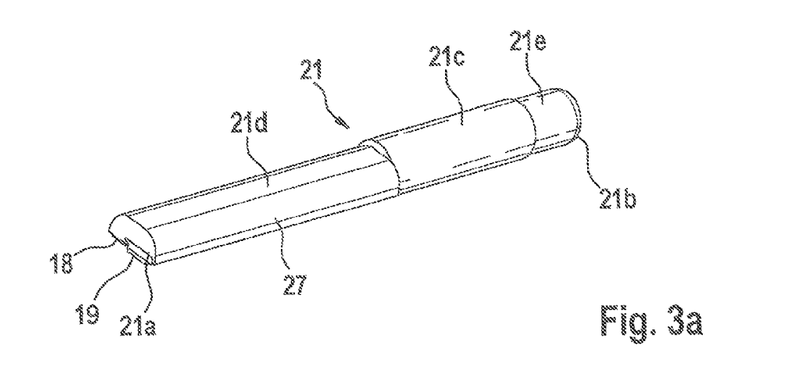
FIG. 3a shows a schematic representation of a first molded part of the sensor device for detecting the displacement of the master brake cylinder piston of the master brake cylinder situated on and/or in the hydraulic unit according to the preferred specific embodiment of the present invention.

FIG. 3a shows a schematic representation of a first molded part of the sensor device for detecting the displacement of the master brake cylinder piston of the master brake cylinder situated on and/or in the hydraulic unit according to the preferred specific embodiment of the present invention.

Sensor device 10, in particular first molded part 21 of sensor device 10, includes an integrated circuit 19 which is situated on a circuit board 18. Integrated circuit 19 is preferably situated on a first end section 21a of first molded part 21. Electrical contact elements for contacting second molded part 22 are preferably situated on a second end section 21b of first molded part 21. In a predetermined section, first molded part 21 also includes a rotationally symmetrical part 21c and a nonrotationally symmetrical part 21d. Nonrotationally symmetrical part 21d, also referred to as molding 27, has the function of connecting in a form-fit manner first molded part 21 of sensor device 10 to a groove or shoulder (not shown in FIG. 3a) formed in opening 16c in brake booster 5.

Figure 3B:
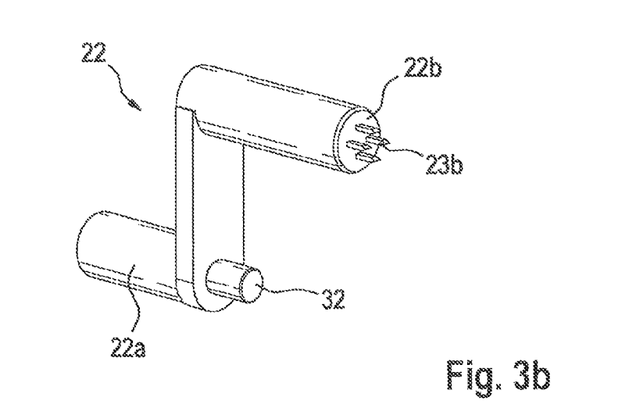
FIG. 3b shows a schematic representation of a second molded part of the sensor device for detecting the displacement of the master brake cylinder piston of the master brake cylinder situated on and/or in the hydraulic unit according to the preferred specific embodiment of the present invention.

FIG. 3b shows a schematic representation of a second molded part of the sensor device for detecting the displacement of the master brake cylinder piston of the master brake cylinder situated on and/or in the hydraulic unit according to the preferred specific embodiment of the present invention.

At a first end section 22a, second molded part 22 includes electrical contact elements 23a for contacting evaluation electronics system 14, and at a second end section 22b includes electrical contact elements 23b for contacting first molded part 21. In addition, at a predetermined section, pin 32 is provided which protrudes from a surface of second molded part 22 of sensor device 10 in such a way that in the installed state of second molded part 22 of sensor device 10, the pin defines a position, an angular orientation, and/or a depth stop of molded part 22.

Figure 3C:
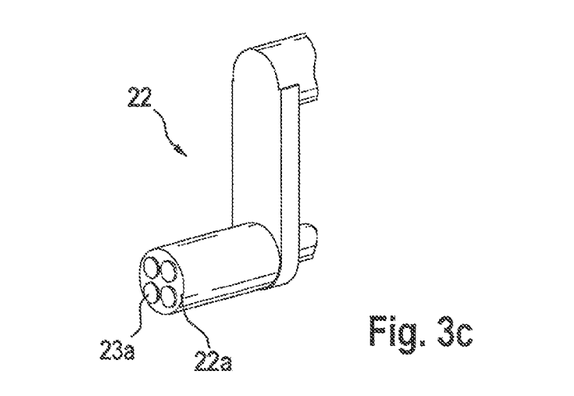
FIG. 3c shows a schematic representation of a partial section of the second molded part of the sensor device for detecting the displacement of the master brake cylinder piston of the master brake cylinder situated on and/or in the hydraulic unit according to the preferred specific embodiment of the present invention.

FIG. 3c shows a schematic representation of a partial section of the second molded part of the sensor device for detecting the displacement of the master brake cylinder piston of the master brake cylinder situated on and/or in the hydraulic unit according to the preferred specific embodiment of the present invention.

First end section 22a of second molded part 22 preferably includes contacts 23a for contacting evaluation electronics system 14.

Figure 3D:
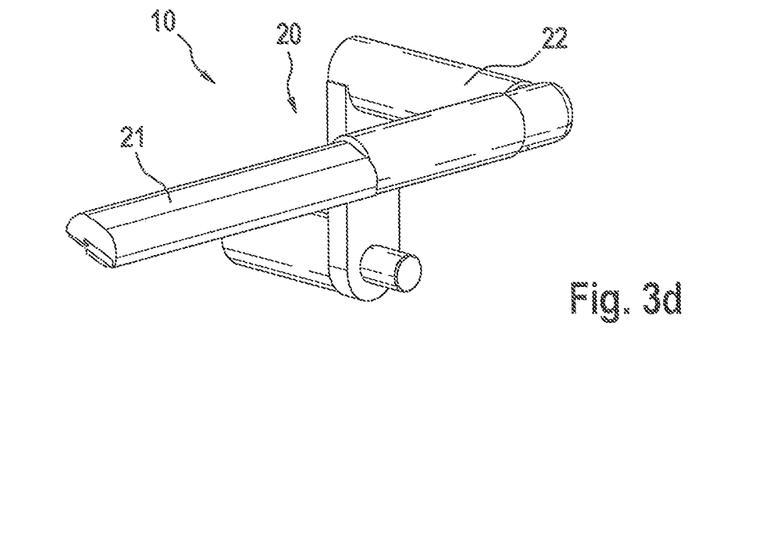
FIG. 3d shows a schematic representation of the sensor device for detecting the displacement of the master brake cylinder piston of the master brake cylinder situated on and/or in the hydraulic unit according to the preferred specific embodiment of the present invention.

FIG. 3d shows a schematic representation of the sensor device for detecting the displacement of the master brake cylinder piston of the master brake cylinder situated on and/or in the hydraulic unit according to the preferred specific embodiment of the present invention.

In the installed state, sensor device 10, which is preferably formed by a plastic support 20, is shaped in such a way that the sensor device is adapted to predetermined structural requirements of braking system 1 of the motor vehicle.

Figure 4:
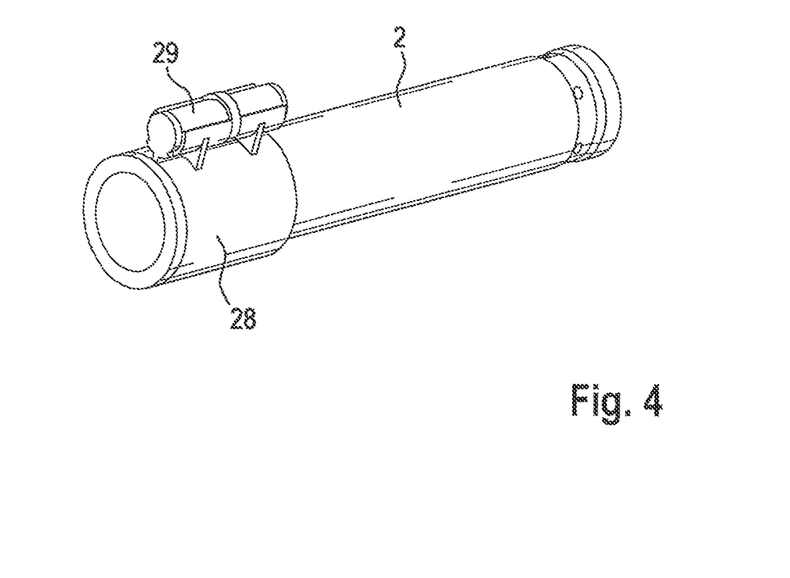
FIG. 4 shows a schematic representation of a magnet situated on the master brake cylinder piston according to the preferred specific embodiment of the present invention.

FIG. 4 shows a schematic representation of a magnet situated on the master brake cylinder piston according to the preferred specific embodiment of the present invention.

Support element 28 for magnet 29 is situated on and axially fixed to master brake cylinder piston 2. The axial fixing of support element 28 to master brake cylinder piston 2 is preferably provided by two collar elements (not shown in FIG. 4) which circumferentially surround master brake cylinder piston 2. Support element 28 is situated between the two collar elements in a form-fit manner. Axial displacement of support element 28 along master brake cylinder piston 2 is therefore not possible.

Support element 28 is designed in the form of a clasp which partially surrounds master brake cylinder piston 2. In a central area of support element 28, the support element includes a holding device for accommodating magnet 29. Magnet 29 may thus be axially fixed via support element 28.

Radial fixing of support element 28 and of magnet 29 on master brake cylinder piston 2, i.e., fixing of the angular position of support element 28 and of magnet 29 relative to master brake cylinder piston 2, is preferably provided by inserting support element 28 and magnet 29 into an opening formed in brake booster 5 for accommodating support element 28 and magnet 29.

Figure 5:
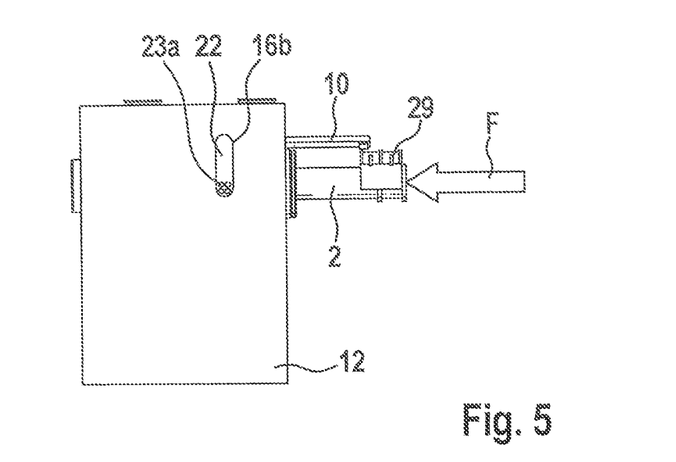
FIG. 5 shows a schematic representation of the sensor device for detecting the displacement of the master brake cylinder piston of the master brake cylinder situated on and/or in the hydraulic unit according to the preferred specific embodiment of the present invention.

FIG. 5 shows a schematic representation of the sensor device for detecting the displacement of the master brake cylinder piston of the master brake cylinder situated on and/or in the hydraulic unit according to the preferred specific embodiment of the present invention.

Master brake cylinder piston 2 is shown in FIG. 5 in a first extended position. In this position of master brake cylinder piston 2, the brake pedal of the motor vehicle, which is coupled to master brake cylinder piston 2 via a brake booster, is not actuated. The spindle, which is driven by an electric motor and which is designed for displacing master brake cylinder piston 2 of the master brake cylinder, is thus likewise in a zero position. A force F applied to master brake cylinder piston 2 is therefore also zero.

Magnet 29, which is situated on master brake cylinder piston 2 with the aid of support element 28, is situated adjacent to sensor device 10. Magnet 29 is thus displaced axially parallel to master brake cylinder piston 2 when the latter is displaced. Sensor device 10 detects the displacement of magnet 29 by evaluating the angles of the magnetic field lines of magnet 29. In the present specific embodiment, sensor device 10 operates according to the Hall principle. Alternatively, some other suitable sensor device may be provided. Second molded part 22 together with electrical contact elements 23a for contacting the control device is situated in an opening formed at the side of hydraulic unit 12. The side of hydraulic unit 12 is situated perpendicular to an axial direction of master brake cylinder piston 2.

Figure 6:
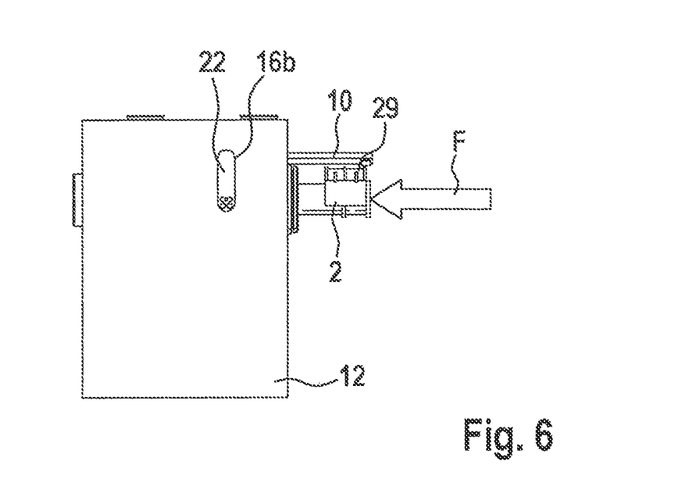
FIG. 6 shows a schematic representation of the sensor device for detecting the displacement of the master brake cylinder piston of the master brake cylinder situated on and/or in the hydraulic unit according to the preferred specific embodiment of the present invention.

FIG. 6 shows a schematic representation of the sensor device for detecting the displacement of the master brake cylinder piston of the master brake cylinder situated on and/or in the hydraulic unit according to the preferred specific embodiment of the present invention.

In FIG. 6, master brake cylinder piston 2 and magnet 29 situated on master brake cylinder piston 2 are in a second position which is axially displaced relative to the first position.

Sensor device 10 detects a change in the angles of the magnetic field lines of magnet 29, and on this basis computes the displacement of master brake cylinder piston 2. Sensor device 10 is stationary in the angular position as well as in the axial and radial positions, and is situated at a predefined distance above magnet 29.

Figure 7:
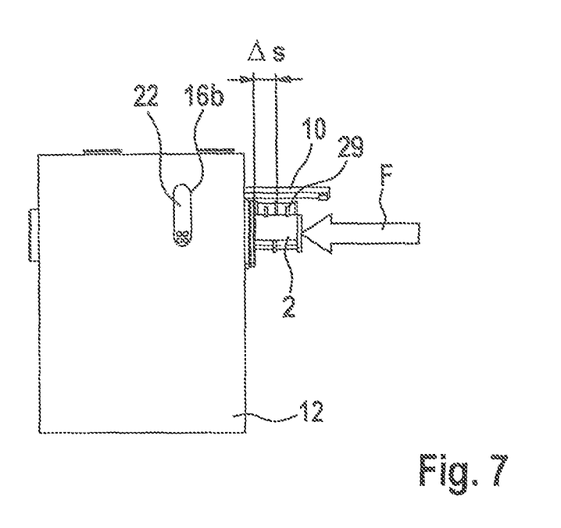
FIG. 7 shows a schematic representation of the sensor device for detecting the displacement of the master brake cylinder piston of the master brake cylinder situated on and/or in the hydraulic unit according to the preferred specific embodiment of the present invention.

FIG. 7 shows a schematic representation of the sensor device for detecting the displacement of the master brake cylinder piston of the master brake cylinder situated on and/or in the hydraulic unit according to the preferred specific embodiment of the present invention.

In the third position of master brake cylinder piston 2 of the master brake cylinder shown in FIG. 7, the master brake cylinder piston is fully retracted. In the event of a failure of the electric motor (not shown in FIG. 7) for driving the spindle, which effectuates the displacement of master brake cylinder piston 2 of the master brake cylinder, the third position of master brake cylinder piston 2 forms a fallback level. The braking system, which in the present exemplary embodiment is an electrohydraulic braking system, is thus switched into a state of a power system. The brake booster is disengaged, and preferably a front axle of the motor vehicle is connected to the master brake cylinder.

Figure 8:
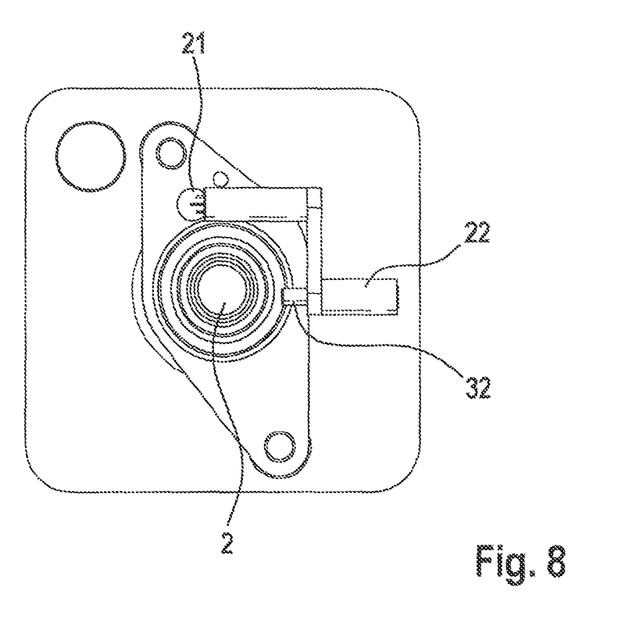
FIG. 8 shows a side view of selected components of the sensor device for detecting the displacement of the master brake cylinder piston of the master brake cylinder situated on and/or in the hydraulic unit according to the preferred specific embodiment of the present invention.

FIG. 8 shows a side view of selected components of the sensor device for detecting the displacement of the master brake cylinder piston of the master brake cylinder situated on and/or in the hydraulic unit according to the preferred specific embodiment of the present invention.

The magnet or magnets, which are displaceably situated axially parallel to master brake cylinder piston 2, is/are guided in the opening in hydraulic unit 12. In the present exemplary embodiment, first molded part 21, which is situated axially parallel to master brake cylinder piston 2, is situated above the master brake cylinder piston, slightly offset with respect to a center axis of master brake cylinder piston 2. Second molded part 22 is situated perpendicular to first molded part 21, and contacts first molded part 21 via the electrical contacts, provided at the end section of second molded part 22, for contacting first molded part 21.

Second molded part 22 also includes pin 32, which holds molded part 22 in a predetermined angular position relative to hydraulic unit 12 and which is used as an end stop for second molded part 22. The signal generated by sensor device 10 is thus preferably transmitted directly to evaluation electronics system 14 via first molded part 21 and second molded part 22 of the sensor.

Figure 9:
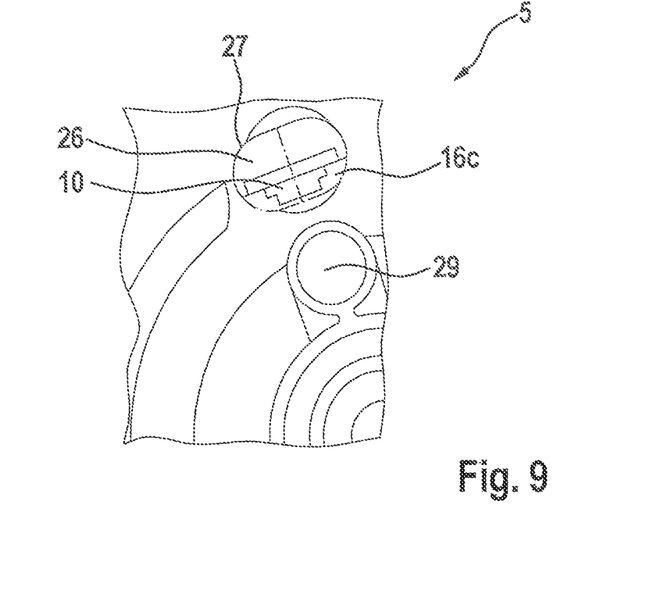
FIG. 9 shows a cross-sectional view of the brake booster together with the sensor device accommodated therein for detecting the displacement of the master brake cylinder piston of the master brake cylinder situated on and/or in the hydraulic unit according to the preferred specific embodiment of the present invention.

FIG. 9 shows a cross-sectional view of the brake booster together with the sensor device accommodated therein for detecting the displacement of the master brake cylinder piston of the master brake cylinder situated on and/or in the hydraulic unit according to the preferred specific embodiment of the present invention.

Sensor device 10, in particular rotationally symmetrical part 21c of the first molded part of sensor device 10, is inserted into first opening 16a (not shown in FIG. 9) in hydraulic unit 12. Nonrotationally symmetrical part 21d of the first molded part of sensor device 10 is inserted into opening 16c in brake booster 5.

Opening 16c includes a groove or shoulder 26 in this section. Nonrotationally symmetrical part 21d of first molded part 21 of sensor device 10 includes molding 27. In the present installed state of sensor device 10, first molded part 21 of sensor device 10 is situated in such a way that molding 27 engages with groove or shoulder 26 of opening 16c in brake booster 5 for connecting sensor device 10 to opening 16c in a form-fit manner. An angular orientation of sensor device 10 relative to adjacently situated magnet 29 may thus be advantageously provided. Groove or shoulder 26 provided in sections in opening 16c in brake booster 5 is also likewise used as an axial securing element or stop of sensor device 10 or of the plastic support of sensor device 10.

Support element 28 and magnets 29 are accommodated in the opening, which is formed axially parallel to opening 16c in brake booster 5 for accommodating sensor device 10. The opening is shaped in such a way that it corresponds to the shape of support element 28 and of magnets 29. The support element and magnets may thus be accommodated in a form-fit manner in the opening and guided therein. Fixing the angular position of support element 28 and of magnets 29 relative to master brake cylinder piston 2 is likewise possible due to an appropriate spatial orientation of the opening in brake booster 5 for accommodating support element 28 and magnets 29.

Figure 10:
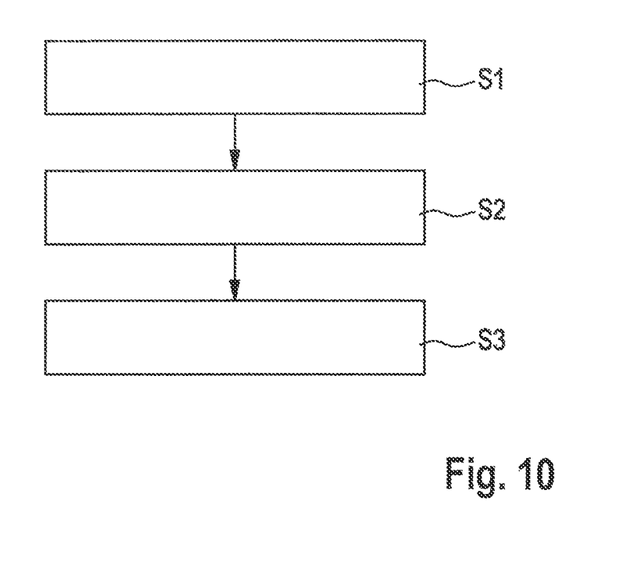
FIG. 10 shows a flow chart of a method for installing the sensor device for detecting the displacement of the master brake cylinder piston of the master brake cylinder situated on and/or in the hydraulic unit according to the preferred specific embodiment of the present invention.

FIG. 10 shows a flow chart of a method for installing the sensor device for detecting the displacement of the master brake cylinder piston of the master brake cylinder situated on and/or in the hydraulic unit according to the preferred specific embodiment of the present invention.

The method includes partially introducing S1 a first molded part of the sensor device, on or in which a sensor element is situated, the first molded part including a first electrical contact element, into a first opening in the hydraulic unit. The method also includes partially introducing S2 a second molded part of the sensor device, on or in which an evaluation electronics system is situated, the second molded part including a second electrical contact element, into a second opening in the hydraulic unit. The method also includes connecting S3 the first molded part to the second molded part for transmitting a physical variable from the sensor element to the evaluation electronics system by connecting the first electrical contact element of the first molded part to the second electrical contact element of the second molded part.

During the installation of sensor device 10 for detecting a displacement of a master brake cylinder piston 2 of a master brake cylinder 3 situated on and/or in a hydraulic unit 12, initially sealing rings of a floating circuit and of a rod circuit of master brake cylinder 3 are installed. A spring of the floating circuit and of a piston of the floating circuit are subsequently installed. The floating circuit is subsequently sealed. A guide element or centering element is subsequently installed. A piston of the rod circuit of master brake cylinder 3, on which a magnet 29 is situated with the aid of a support element 28, is subsequently installed.

Sensor device 10 is then introduced into openings 16a, 16b in the hydraulic unit and opening 16c in the brake booster. An angular position of first molded part 21 of sensor device 10 has already been oriented prior to the introduction. First molded part 21 is electrically connected to second molded part 22 via the provided electrical contact elements. Support element 28 of magnet 29 is accommodated in a borehole in the brake booster, which is axially parallel to opening 16c. Sensor device 10 is preferably fastened in the hydraulic unit by a plurality of screws.

Although the present invention has been described above with reference to preferred exemplary embodiments, it is not limited thereto, and may be modified in numerous ways. In particular, the present invention may be changed or modified in various ways without departing from the core of the present invention.

For example, the sensor device may also be guided in some other suitable way from the evaluation electronics system, through the hydraulic unit, to the measuring position.

What is claimed is:

1. A sensor device for detecting a displacement of a master brake cylinder piston of a master brake cylinder situated at least one of on and in a hydraulic unit, comprising:
   at least one sensor element;
   an evaluation electronics system, wherein the at least one sensor element is configured in such a way that the displacement of the master brake cylinder piston changes at least one physical variable in the at least one sensor element, and the evaluation electronics system is configured for determining information concerning the displacement of the master brake cylinder piston, taking into account the at least one physical variable;
   a first molded part one of on or in which the at least one sensor element is situated, the first molded part including at least one first electrical contact element, and the first molded part being at least partially introducible into a first opening in the hydraulic unit; and
   a second molded part one of on or in which the evaluation electronics system is situated, the second molded part including at least one second electrical contact element, and the second molded part being at least partially introducible into a second opening in the hydraulic unit;
   wherein the at least one first electrical contact element of the first molded part which is at least partially introduced into the first opening contacts the at least one second electrical contact element of the second molded part which is at least partially introduced into the second opening, in such a way that the at least one physical variable is transmitted from the at least one sensor element to the evaluation electronics system.

2. The sensor device as recited in claim 1, wherein the at least one sensor element is situated on a circuit board, the first molded part including a lead frame which connects the circuit board to the at least one first electrical contact element of the first molded part, and the second molded part including a lead frame which connects the at least one second electrical contact element of the second molded part to the evaluation electronics system.

3. The sensor device as recited in claim 1, wherein the first molded part of the sensor device includes a rotationally symmetrical part and a nonrotationally symmetrical part, the rotationally symmetrical part being introducible into the first opening in the hydraulic unit and the nonrotationally symmetrical part being introducible into an opening in a brake booster, the nonrotationally symmetrical part including a molding which is configured to be connected in a form-fit manner to one of a groove or a shoulder of the opening in the brake booster.

4. The sensor device as recited in claim 1, wherein the second molded part of the sensor device is configured in such a way that a position, an angular orientation, and a depth stop of the second molded part in the second opening in the hydraulic unit are defined.

5. The sensor device as recited in claim 1, wherein the at least one sensor element is configured for detecting a displacement of the master brake cylinder piston of the master brake cylinder situated at least one of on and in the hydraulic unit by detecting a movement of a support element relative to the at least one sensor element, wherein the support element is situated on the master brake cylinder piston of the master brake cylinder and provided with at least one magnet.

6. A hydraulic unit configured for cooperating with a sensor device for detecting a displacement of a master brake cylinder piston of a master brake cylinder situated at least one of on and in a hydraulic unit, the sensor device including: at least one sensor element; an evaluation electronics system, wherein the at least one sensor element is configured in such a way that the displacement of the master brake cylinder piston changes at least one physical variable in the at least one sensor element, and the evaluation electronics system is configured for determining information concerning the displacement of the master brake cylinder piston, taking into account the at least one physical variable; a first molded part one of on or in which the at least one sensor element is situated, the first molded part including at least one first electrical contact element, and the first molded part being at least partially introducible into a first opening in the hydraulic unit; and a second molded part one of on or in which the evaluation electronics system is situated, the second molded part including at least one second electrical contact element, and the second molded part being at least partially introducible into a second opening in the hydraulic unit; wherein the at least one first electrical contact element of the first molded part which is at least partially introduced into the first opening contacts the at least one second electrical contact element of the second molded part which is at least partially introduced into the second opening, in such a way that the at least one physical variable is transmitted from the at least one sensor element to the evaluation electronics system, the hydraulic unit comprising:
the first opening configured for at least partially accommodating the first molded part of the sensor device; and
the second opening configured for at least partially accommodating the second molded part of the sensor device, wherein the first and second openings are configured in such a way that the at least one first electrical contact element of the first molded part which is at least partially introduced into the first opening contacts the at least one second electrical contact element of the second molded part which is at least partially introduced into the second opening, in such a way that the at least one physical variable is transmitted from the at least one sensor element to the evaluation electronics system.

7. The hydraulic unit as recited in claim 6, wherein the first opening and the second opening in the hydraulic unit are each formed by a borehole, at least one of the first molded part and the second molded part being fixable in the borehole in a predetermined orientation.

8. The hydraulic unit as recited in claim 6, wherein a third opening in a brake booster has, at least in sections, one of a groove or shoulder which is configured for cooperating with a molding of the first molded part in the installed state of the first molded part in such a way that the first molded part is situated in the third opening in a form-fit manner.

9. The hydraulic unit as recited in claim 6, wherein a support element for at least one magnet is situated on and axially fixed to the master brake cylinder piston of the master brake cylinder, the support element being accommodated in a further opening in the brake booster axially parallel to the third opening.

10. The hydraulic unit as recited in claim 6, wherein the second opening in the hydraulic unit is configured in such a way that a position, an angular orientation, and a depth stop of the second molded part in the second opening in the hydraulic unit are defined.

11. A braking system for a motor vehicle, comprising:
a sensor device for detecting a displacement of a master brake cylinder piston of a master brake cylinder situated at least one of on and in a hydraulic unit, the sensor device including:
at least one sensor element;
an evaluation electronics system, wherein the at least one sensor element is configured in such a way that the displacement of the master brake cylinder piston changes at least one physical variable in the at least one sensor element, and the evaluation electronics system is configured for determining information concerning the displacement of the master brake cylinder piston, taking into account the at least one physical variable;
a first molded part one of on or in which the at least one sensor element is situated, the first molded part including at least one first electrical contact element, and the first molded part being at least partially introducible into a first opening in the hydraulic unit; and
a second molded part one of on or in which the evaluation electronics system is situated, the second molded part including at least one second electrical contact element, and the second molded part being at least partially introducible into a second opening in the hydraulic unit;
wherein the at least one first electrical contact element of the first molded part which is at least partially introduced into the first opening contacts the at least one second electrical contact element of the second molded part which is at least partially introduced into the second opening, in such a way that the at least one physical variable is transmitted from the at least one sensor element to the evaluation electronics system; and a hydraulic unit configured for cooperating with the sensor device, the hydraulic unit including:

the first opening configured for at least partially accommodating the first molded part of the sensor device; and the second opening configured for at least partially accommodating the second molded part of the sensor device, wherein the first and second openings are configured in such a way that the at least one first electrical contact element of the first molded part which is at least partially introduced into the first opening contacts the at least one second electrical contact element of the second molded part which is at least partially introduced into the second opening, in such a way that the at least one physical variable is transmitted from the at least one sensor element to the evaluation electronics system.

12. A method for installing a sensor device for detecting a displacement of a master brake cylinder piston of a master brake cylinder situated at least one of on and in a hydraulic unit, comprising:

at least partially introducing a first molded part of the sensor device into a first opening in the hydraulic unit, wherein at least one sensor element is situated one of one or in the first molded part, and wherein the first molded part includes at least one first electrical contact element;

at least partially introducing a second molded part of the sensor device into a second opening in the hydraulic unit, wherein an evaluation electronics system is situated in the second molded part, the second molded part including at least one second electrical contact element; and connecting the first molded part to the second molded part for transmitting a physical variable from the at least one sensor element to the evaluation electronics system by connecting the first electrical contact element of the first molded part to the second electrical contact element of the second molded part.

13. The method as recited in claim 12, wherein the first molded part of the sensor device includes a rotationally symmetrical part and a nonrotationally symmetrical part, the rotationally symmetrical part being introduced into the first opening in the hydraulic unit and the nonrotationally symmetrical part being introduced into an opening in the brake booster, the nonrotationally symmetrical part including a molding which is connected in a form-fit manner to one of a groove or a shoulder of the opening in the brake booster.

* * * * *